US006540972B1

(12) United States Patent
Hiura (10) Patent No.: US 6,540,972 B1
(45) Date of Patent: Apr. 1, 2003

(54) CARBON MATERIAL AND METHOD OF PREPARING THE SAME

(75) Inventor: Hidefumi Hiura, Tokyo (JP)

(73) Assignee: NEC Corporation, Tokyo (JP)

( * ) Notice: Subject to any disclaimer, the term of this patent is extended or adjusted under 35 U.S.C. 154(b) by 510 days.

(21) Appl. No.: 09/432,610

(22) Filed: Nov. 3, 1999

Related U.S. Application Data (62) Division of application No. 08/968,430, filed on Nov. 12, 1997, now Pat. No. 6,083,624.

(30) Foreign Application Priority Data

Nov. 12, 1996 (JP) ............................................. 8-315617

(51) Int. Cl.$^7$ ............................................. C01B 31/04
(52) U.S. Cl. ......................................... 423/448; 264/44
(58) Field of Search .......................... 264/44; 423/448, 423/460; 204/157.44, 157.47

(56) References Cited

U.S. PATENT DOCUMENTS

| | | | |
|---|---|---|---|
| 4,822,466 A | 4/1989 | Rabalais et al. | 204/192.15 |
| 4,898,557 A | 2/1990 | Engemann | 445/49 |
| 5,041,730 A | 8/1991 | Attix | 250/385.1 |
| 5,271,917 A | * 12/1993 | Hoffman | 423/447.6 |
| 5,374,318 A | 12/1994 | Rabalais et al. | 428/469 |
| 5,457,343 A | 10/1995 | Ajayan et al. | 257/734 |
| 5,551,904 A | 9/1996 | Hedges et al. | 445/47 |

FOREIGN PATENT DOCUMENTS

JP    6-257019    9/1994

OTHER PUBLICATIONS

Jones, '(–Axis Microlone Formation In Nuclear Graphites One To Graphite Removal By Impunity–Inhibited Electronically–Excited Oxidation Reactions' in *Carbon* vol. 8 #5 (1970) pp. 681–683, Nov. 1970.*
Brown, 'The Equliateral Native of the Hexagonal Etch At Developed during Carbon Oxidation', in *Carbon* vol. 25 #5 (1987), no month.*
H.W. Kroto et al., "$C_{60}$ : Buckminsterfullerene", pp. 162–163, Nature, vol. 318, No. 6042, Nov. 14, 1985.
Sumio Iijima, "Helical microtubules of graphitic carbon", pp. 56–58, Nature, vol. 354, Nov. 7, 1991.
T.W. Ebbesen et al., "Electrical conductivity of individual carbon nanotubes", pp. 54–56, Nature, vol. 382, Jul. 4, 1996.
M.M.J. Treacy et al., "Exceptionally high Young's modulus observed for individual carbon nanotubes", pp. 678–680, Nature, vol. 381, Jun. 20, 1996.
H. Hiura et al., "Role of $sp^3$ defect structures in graphite and carbon nanotubes", pp. 148–151, Nature, vol. 367, No. 6459, Jan. 13, 1994.
Thomas W. Ebbesen et al., "Graphene in 3–Dimensions: Towards Graphite Origami", pp. 582–586, Advanced Materials, vol. 7, No. 6, Jun. 1995.

* cited by examiner

*Primary Examiner*—Stuart L. Hendrickson
(74) *Attorney, Agent, or Firm*—Young & Thompson (57) ABSTRACT

A graphite having geometrically shaped holes limited to the top atomic layer such as circles, polygons and combinations thereof, and a method of preparing a graphite having geometrically shaped holes such as circles, polygons and combinations thereof where the geometrically shaped holes are limited to the top atomic layer.

10 Claims, 12 Drawing Sheets

(4 of 12 Drawing Sheet(s) Filed in Color)

CARBON MATERIAL AND METHOD OF PREPARING THE SAME

CROSS-REFERENCE TO RELATED APPLICATIONS

This application is a division of application Ser. No. 08/968,430, filed Nov. 12, 1997 now U.S. Pat. No. 6,083,624.

BACKGROUND OF THE INVENTION

The present invention relates to a carbon material and a method of preparing the same, and more particularly to a carbon material usable in the field of chemical and electronics in the next generation.

In the prior art, as carbon materials, there have been known carbon black, amorphous carbon, glass carbon, graphite, and diamond. Carbon black, amorphous carbon and glass carbon are carbon materials without a constant periodical structure.

By contrast, graphite comprises laminations of carbocyclic meshed two dimensional sheets, adjacent two of which are displaced by a half period from each other which provides two dimensional electrical conductivity. The bulk structure of graphite and properties thereof have been well known. Diamond has a three dimensional crystal structure so called as diamond structure which has a high strength widely useable.

Recently, however, as new carbon materials other than the conventional carbon materials, fullerenes such as $C_{60}$ and carbon nanotubes have been on receipt of a great deal of attention. In Nature, vol. 318, pp. 162–163, 1985, it is disclosed that $C_{60}$ comprises 60 carbon atoms in the form of football or soccerball. $C_{60}$ has a high symmetry of electron structure which allows $C_{60}$ to show various properties such as semiconductor properties, electrical conductance properties and superconductance properties, for which reason $C_{60}$ is attractive accordingly.

A carbon nanotube comprises a plurality of co-axial cylinders of graphite sheets. A carbon nanotube has a diameter in the order of nanometer. Although carbon tube of micrometer order in diameter have long been known carbon nanotube was first reported in Nature, vol. 354, pp. 56–58, 1985. Carbon nanotube have received a great deal of attention as being applicable to one-dimensional conductive wire, catalyst, super-reinforced structure.

Particularly, electrical properties of each graphite sheet cylinder of the carbon nanotube depend upon the diameter and helical structure thereof. Those electrical properties are variable in the range from metal to semiconductors with various energy band gaps, for which reason the carbon nanotube is extremely attractive. Nature, vol. 382, pp. 54–56, 1996 reported that individual carbon nanotubes differing in structure show unexpectably various electrical properties. There facts were confirmed by measurement of electrical conductivity using four-probe circuits made by lithography. Recently, Nature, vol. 381, pp. 678–680, 1996 reported that a larger rigidity of carbon nanotube than diamond was theoretically expected and experimentally confirmed.

Following to the discovery of properties of fullerene and carbon nanotube, any new carbon material has been investigated. One of the new carbon material is disclosed in Japanese laid-open patent publication No. 6-257019 which has a micro-geometric structure formed by cutting and folding a graphite sheet along a symmetrical axis thereof The above micro-structure of the graphite is considered as folding paper so call "Origami". The structure was experimentally explicated by atomic force microscopy and scanning tunneling microscopy. The above micro-sticture of the graphite is disclosed in Nature, vol. 367, pp. 148–151, 1995 and Advanced Materials, vol. 76, pp. 582–586, 1995.

Recently, a graphite ribbon as a simplest model of the graphite folding papers "Graphite Origami" is theoretically calculated to find its specific and unique properties different from the conventional graphite. This is disclosed in Surface, Vol. 34(4), pp. 49–56, 1996.

The graphite ribbon is a graphite strip as one dimensional graphite with a finite size, whilst the normal graphite sheet is a two-dimensional sheet with infinite size.

Figure 1:
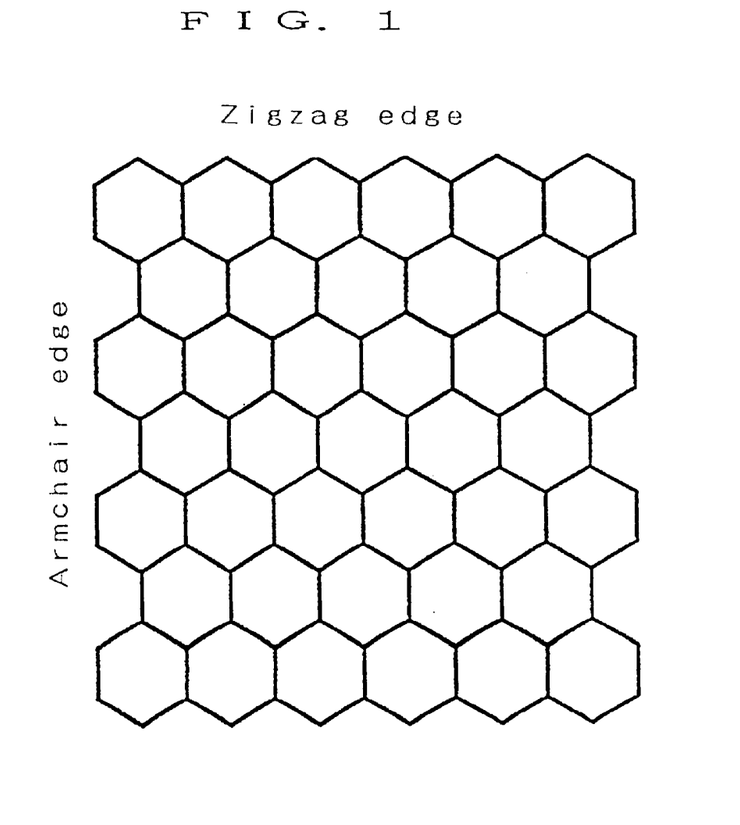
FIG. 1 is a view illustrative of the most typical edge structure of graphite with armchair edge and zigzag edge.

The properties of the graphite ribbon largely depends upon its edge structure. The most typical edge structures are, as illustrated in FIG. 1, armchair edge and zigzag edge. The former edge is obtained when the graphite sheet is cut in a direction parallel to C—C bonding, whilst the later edge is obtained when the graphite sheet is cut in a direction vertical to C—C bonding.

In accordance with band calculation, when the width of the graphite ribbon having the armchair edge is widen, a metal appears every three and an insulator appears in other cases. When the insulator appears, as the width of the graphite ribbon is increased, the band gap is decreased so that the graphite ribbon might be regarded as a semiconductor. Such periodic properties are unique electron properties when conceiving the carbon nanotube.

On the other hand, the graphite ribbon with the zigzag edge shows a peak of density of state in the vicinity of the Fermi level which represents localization. Unstability on Fermi surface is caused, resulting in generation of finite magnetization. It is presumed that a local ferromagnetic order appears. Ferromagnetic property could never appear in the infinite two dimensional graphite sheet.

For the above reasons, expectations to the graphite ribbon and graphite folding paper "Graphite Origami" are possible.

However, the conventional carbon materials have some problems as described above. It is not easy to apply carbon black, amorphous carbon and glass carbon as well as graphite and diamond to the electronic devices. Carbon black, amorphous carbon and glass carbon are without periodic structure, for which reason there is variation in property over positions and it is difficult to obtain a constant and specific property. It has not been known to form a micro-structure of graphite and diamond.

The fullerene is required to be doped with n-type dopant such as alkali metals for application to superconductor and electrical conductor. The compound of fullerene is bard to be dealt with due to its unstability in the atmosphere. No certain and useful technical has been developed for perfect and stable crystal structure in desired area.

Carbon nanotube is applicable to quantum line due to its specific and unique properties and is the most expectable carbon material. Notwithstanding, the shape of the carbon nanotube is limited in shape to the cylinder. It is also difficult to form the carbon nanotube with desired size in the nanometer order.

On the other hand, graphite folding paper "Graphite Origami" has large freedoms in shape and size. Strip, right angle triangle, equilateral triangle, and combination thereof, multiply folded one are, for example, available. Various size of the graphite folding paper may also be available. This means that the graphite folding paper "Graphite Origami"

possess various new properties. Such structure may be formed by cutting and folding the graphite by atomic force microscopy and scanning tunneling microscopy. This is disclosed in Japanese laid-open patent publication No. 6-257019.

The manufacturing of graphite folding paper "Graphite Origami" using atomic force microscopy and scanning tunneling microscopy causes the problems with disturbance of edge in atomic level and the damaging or breaking the graphite.

SUMMARY OF THE INVENTION

Accordingly, it is an object of the present invention to provide a novel micro-structure of carbon material free from the above problems.

It is another object of the present invention to provide a method of preparing a novel micro-structure of carbon material free from the above problems.

The above and other objects, features and advantages of the present invention will be apparent from the following descriptions.

The present innovation provides a graphite having a geometrically shaped hole such as circle, polygons and combinations thereof.

The present innovation also provides a method of preparing a graphite having a geometrically shaped hole such as circle, polygons and combinations thereof.

The present innovation provides a graphite having a straight or geometrically shaped edge.

The present innovation provides a method of preparing a graphite having a straight or geometrically shaped edge.

The present innovation provides a graphite sheet having geometrically shaped holes periodically positioned at a constant pitch.

The present innovation provides a method of preparing a graphite sheet having geometrically shaped holes periodically positioned at a constant pitch.

The present innovation provides a graphite sheet having geometrically shaped holes periodically positioned at a constant pitch and having micro-structures geometrically shaped and positioned other portions than the geometrically shaped holes.

The present innovation provides a method of preparing a graphite sheet having geometrically shaped holes periodically positioned at a constant pitch and having micro-structures geometrically shaped and positioned other portions than the geometrically shaped holes.

The present innovation provides a plurality of micro-structured graphites periodically arranged in two-dimensional space.

The present innovation provides a method of preparing a plurality of micro-structured graphites periodically arranged in two-dimensional space.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Preferred embodiments according to the present invention will be described in detail with reference to the accompanying drawings.

DISCLOSURE OF THE INVENTION

A carbon material in accordance with the present invention has circular holes and combinations therewith in at least a first atomic layer. This carbon material may be prepared as follows. A single or a plurality of micro-holes are formed on graphite surface by irradiation of electron beam or converging ion beam, or converging electron beam or using atomic force microscopy or scanning tunneling microscope, before heating the graphite to grow the micro-holes up to a size of not more than 500 nanometers.

A carbon material in accordance with the present invention has polygonal holes and combinations therewith in at least a first atomic layer.

This carbon material may be prepared as follows. A single or a plurality of micro-holes are formed on a graphite surface by irradiation of electron beam or converging ion beam, or converging electron beam or using atomic force microscopy or scanning tunneling microscope, before heating the graphite to grow the micro-holes up to a size of not more than 500 nanometers.

The graphites with the straight and geometrically shaped edges have micro-holes and combinations therewith in at least a first atomic layer. This carbon material may be prepared as follows. A single or a plurality of micro-holes are formed on graphite surface by irradiation of electron beam or converging ion beam, or converging electron beam or using atomic force microscopy or scanning tunneling microscope,.before heating the graphite to grow up the micro-holes.

In order to obtain the periodical structure, it is required to periodically form a plurality of micro-holes at a constant pitch on the graphite surface before heating the graphite to grow up the micro-holes.

An electron beam is irradiated onto the graphite to selectively form micro-holes only in the top atomic layer at a high accuracy in atomic order level without providing any damage to the second atomic layer underlying the top atomic layer. A micron-circle of about 5–500 nanometers in diameter, an equilateral hexagon of about 500 nanometers to a few micrometers in a distance between parallel opposite sides may be formed wherein a depth of the hole is 0.34 nanometers.

The above micro-holes may be formed selectively only on the top atomic layer without providing any damage to the second atomic layer underlying the top atomic layer by irradiation of converging ion beam and converging electron beam or using probes of the atomic force microscope and scanning tunneling microscope.

Polygonal holes other than hexagonal holes may be formed by combination of hexagonal holes. A plurality of initial holes as seeds are formed at a small distance from each other before heating the graphite to grow the holes up to a size of more than 500 nanometers in anin-plane direction thereby to form polygonal holes other than hexagonal holes.

Micro-process is used to form initial holes on the graphite surface before the heating of the graphite to grow the initial holes in the in-plane direction thereby to form holes regularly positioned and with a periodical graphite pattern. In order to periodically form the holes at a constant pitch, converging ion beam or converging electron beam or probes of the atomic force microscope and scanning tunneling microscope in place of electron beam with poor convergence.

The graphites with the micro-holes of circles or polygons or in combination therewith, and geometrically shaped micro-graphite defined by the holes have straight and curved edges with atomic level accuracy but the base atomic layer underlying the top atomic layer is free of any damage.

By changing the placement of the growth points of the holes, it is possible to form various periodical and geometrical patterns of the micro-graphite.

The sense of forming the geometrical micro-structure such as graphite folding paper "Graphite Origami" as one-dimensional graphite is to obtain specific and unique electric and magnetic properties which are different from those of the two-dimensional graphite sheets. A plurality of this one-dimensional micro-structured graphites may be periodically arranged in two-dimensional space for causing any interactions between them which might provide new properties. It is attractive and useful way to periodically arrange many "Graphite Origami" in consideration of industrial applicability.

In further consideration of the specific and unique properties of the one-dimensional graphite with finite size, it is conceivable that two-dimensional graphite with many finite size holes and two-dimensional graphite with periodically arranged holes might have specific and unique properties. If a crystal of foreign material is grown on the graphite with the periodical patterns, then a new crystal-structure depending upon the periodical patterns might be obtained.

A single or a plurality of micro-holes are formed on the first or top atomic layer of graphite surface without providing any damage to the second atomic layer underlying the top atomic layer by irradiation of electron beam or converging ion beam, or converging electron beam or using atomic force microscopy or scanning tunneling microscope, before heating the graphite to grow up the micro-holes. The combinations of circular holes and hexagonal holes are made to form various geometrical patterns as illustrated in FIGS. 3 through 10.

Figure 2:
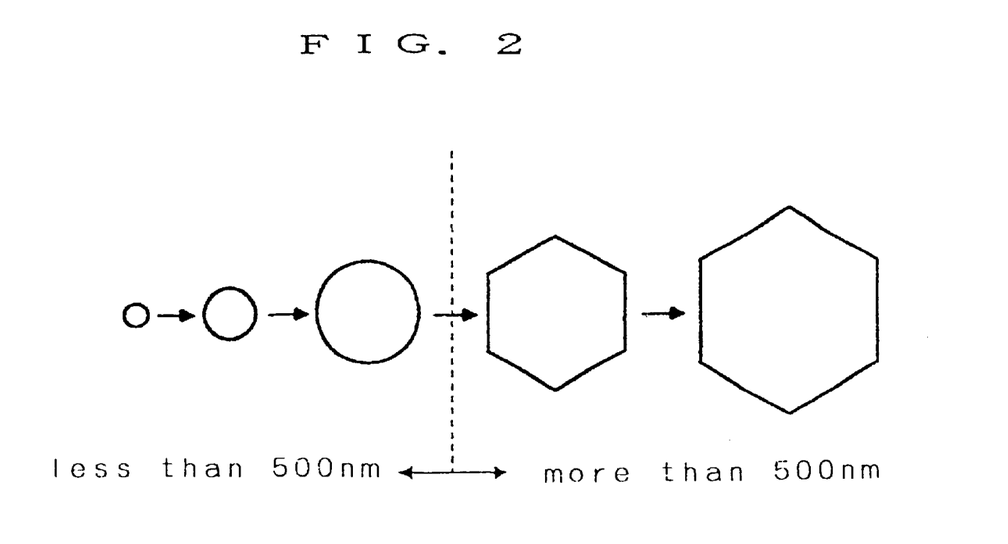
FIG. 2 is a view illustrative of the holes in growth.

The initial holes are formed under a vacuum condition of less than $1\times10^{-6}$ Torr, by irradiation of an electron beam onto the graphite surface, wherein a kinetic energy of electron collision to graphite surface directly forms micro-circular hole referred to as a growth point of hole which is 10 nanometers in diameter, and 0.34 nanometers in depth which is equal to a distance of carbon atomic interlayers, and wherein electron irradiation heats the graphite to cause evaporation of carbon atoms on the circumferences of the micro-holes sequentially and successively thereby to grow up the micro-holes in in-plane direction but not vertical direction. When the size of the holes is less than about 500 nanometers, then the shape of the hole is circle. If, however, the size of the hole exceeds about 500 nanometers, then equilateral hexagon with six rounded angles. FIG. 2 is a view illustrative of the holes in growth.

Opposite sides of the equilateral hexagon are parallel to each other, and a straight line including one side of the equilateral hexagon exactly corresponds to three times symmetrical axis of graphite sheet. This means that carbon atoms are not in random removed or evaporated. This means that carbons aligned in a direction of a two-dimensional lattice of the graphite sheet are concurrently evaporated and subsequently the next alignment of carbon atoms adjacent to the previously evaporated carbon atom alignment will be then evaporated. The edges of the holes are kept to have a great regularity in atomic order level during the growth of the holes.

The important factors of defining the shape and size of the holes are the kinetic energy of electrons to be irradiated onto the graphite, a current density of the electron beam and the product of a surface temperature of the graphite and irradiation or heating time.

The factors of the kinetic energy of electrons and the current density of the electron beam will be described. The kinetic energy of one electron is required to be at least about 4 keV to form initial hole or the growth point of hole. The threshold current density is about $2.5 \times 10^{-1}$ A/cm$^2$. Accordingly, the energy of electron is fixed at 4 keV and the current density of electron beam is set not less than $2.5 \times 10^{-1}$ A/cm$^2$, in order to form the growth point of holes in the graphite. Subsequently, the current density of electron beam is reduced down to less than $2.5 \times 10^{-1}$ A/cm$^2$, in order to heat up the graphite for growth up of the growth point of hole whereby micro-holes of circles or hexagons are then formed only in the top atomic layer of the graphite without providing any damage to the second atomic layer underlying the top atomic layer.

As a modification, it is possible that the current density of electron bean is fixed whilst the electron energy is changed.

The description will focus on the product of the surface temperature of the graphite and the heating time. The surface temperature is kept to be equal to or higher than such a temperature that carbon atoms are gradually evaporated whereby the size of the holes can be controlled by controlling the surface temperature and heating time. A temperature range in which carbon atoms can be evaporated is about 1500–3500° C. The measure of heating the graphite is not limited to the electron beam irradiation. Other heating methods such as resistance heating method and a heating method using graphite furnace.

A method of forming the graphite having periodic and geometrical micro-structure using growth of holes on the graphite will be described. If the growth point of hole is formed by irradiation of electron beam with poor convergence, the placement of the growth points of holes are in random. In order to obtain the periodical structure, it is required to form the growth points of holes at a constant pitch on the graphite surface. The preferable method is processes in nanometer order such as converging ion beam irradiation, converging electron beam irradiation, the use of probes of the atomic force microscope and scanning tunneling microscope.

In order to form the graphite with periodic alignments of geometrically shaped holes, it is important to form the initial holes uniform in size as growth point of hole. It is important to uniformly control the number of electrons or ions per a unit area and a unit time for converging ion beam irradiation or converging electron beam irradiation. It is also important to uniformly control a high bias voltage to be applied to the probe of the atomic force microscope and scanning tunneling microscope.

After the periodic alignments of geometrically shaped holes have been formed on the graphite surface, then the graphite is heated by the electron beam irradiation or the resistance heating method so as to obtain desired size of the holes.

Figure 3A:
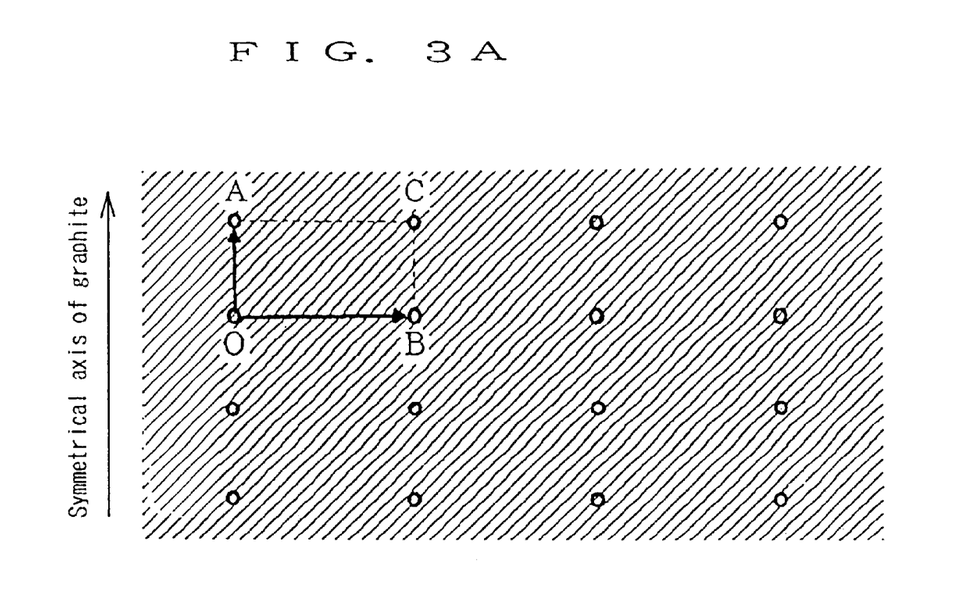
FIG. 3A is a view illustrative of growth points of holes placed in the form of lattice on the graphite surface.
Figure 3B:
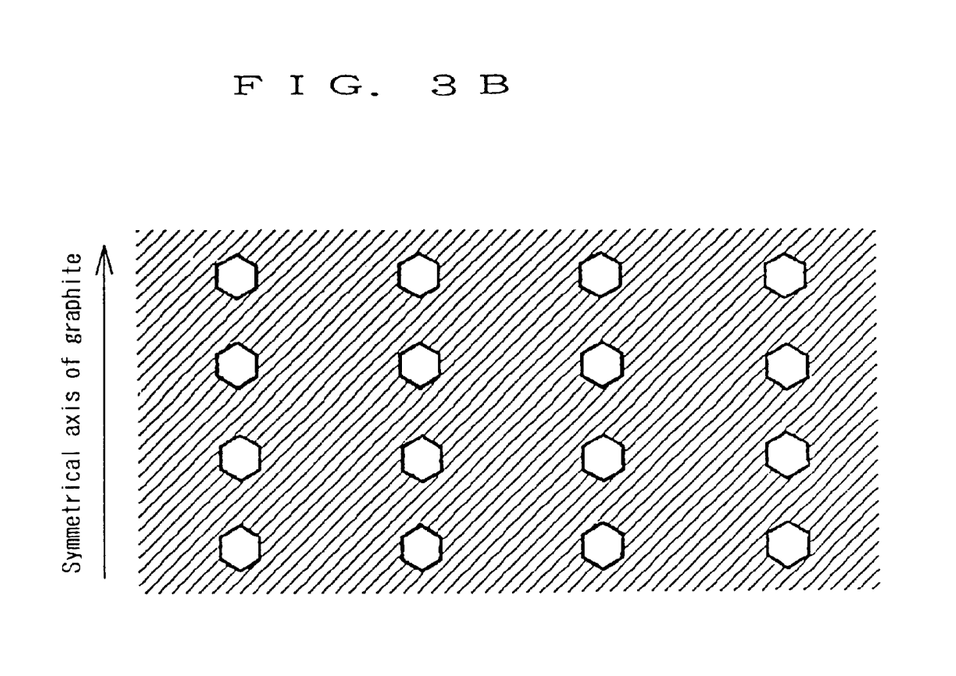
FIG. 3B is a view illustrative of grown holes placed in the form of lattice on the graphite surface during heat treatment.
Figure 3C:
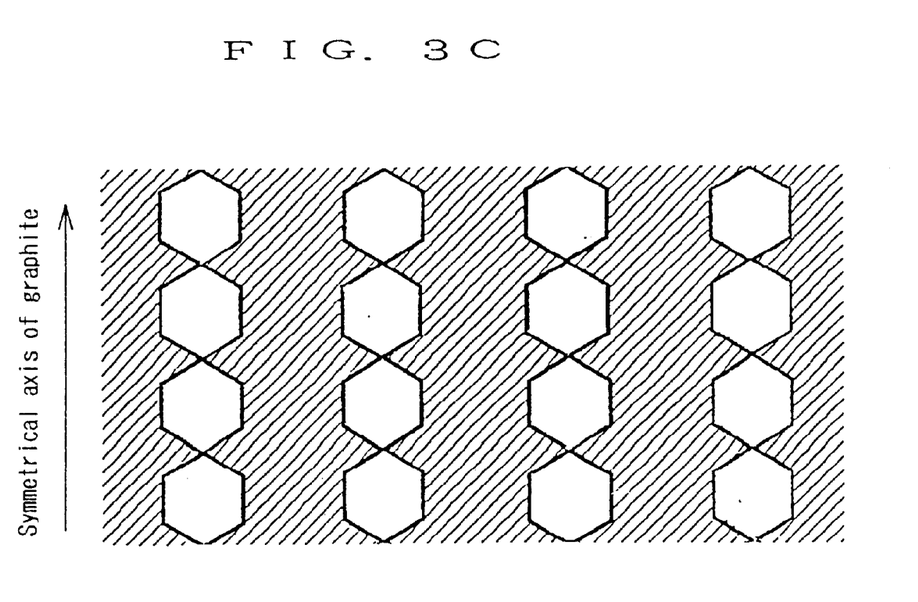
FIG. 3C is a view illustrative of further grown holes placed in the form of lattice on the graphite surface during heat treatment.

FIG. 3A is a view illustrative of growth points of holes placed in the form of lattice on the graphite surface. FIG. 3B is a view illustrative of grown holes placed in the form of lattice on the graphite surface during heat treatment. FIG. 3C is a view illustrative of further grown holes placed in the form of lattice on the graphite surface during heat treatment. FIG. 3C is a view illustrative of periodical graphite micro-structure obtained by furthermore growth of the holes with moreover heat treatment. Crosshatched portions represent the periodical graphite micro-structure and white portions represent holes formed by evaporation of carbon atoms. Up and down direction is parallel to a symmetrical direction of the plane graphite and also parallel to one side of the hexagonal holes.

Figure 3D:
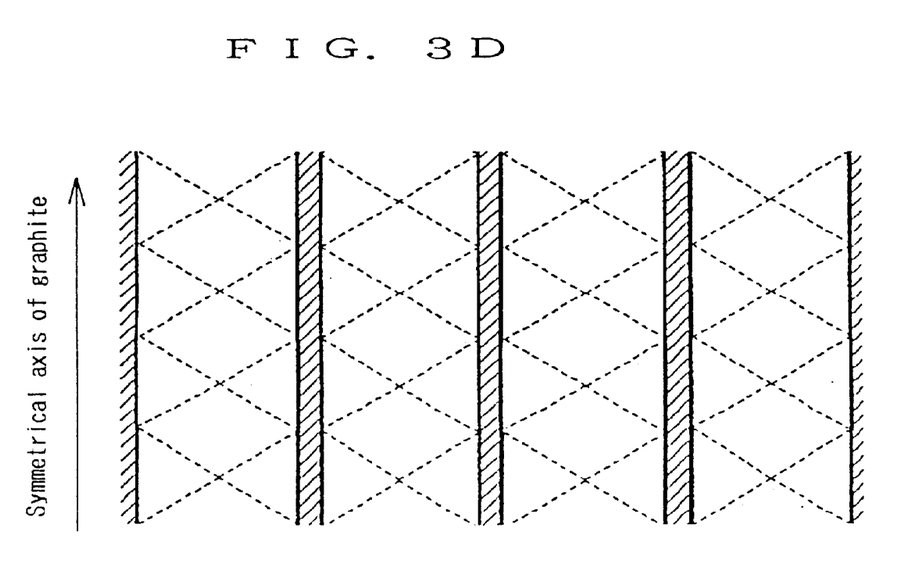
FIG. 3D shows a plurality of periodically and geometrically shaped micro-structures of graphite as having divided the graphite sheet by uniting the adjacent grown holes.

FIG. 3D shows a plurality of periodically and geometrically shaped micro-structures of graphite as having divided the graphite sheet by uniting the adjacent grown holes.

The lattice of growth points of holes is a rectangular lattice having rectangular-shaped unit cells AOBC (∠ AOB= 90 degrees). One axis OA of the lattice is parallel to the symmetrical axis of graphite. In this case, if the growth process is discontinued in the process between processes of FIGS. 3A and 3C, then the graphite sheet with the holes is obtained. If, however, the hole growth process will be continued until the process of FIG. 3D, periodical and parallel alignments at a constant pitch of the strips of graphite or the graphite ribbons are obtained. If the hole growth process will further be continued, then the width of the graphite ribbons is made narrow. The width of the graphite ribbons is controllable by controlling the time period of the hole growth process. In view of geometry, a vertical-to-horizontal ratio of the lattice is required to be larger than $\sqrt{3}$ (line segment OB/line segment OA >1.7320508).

Figure 4A:
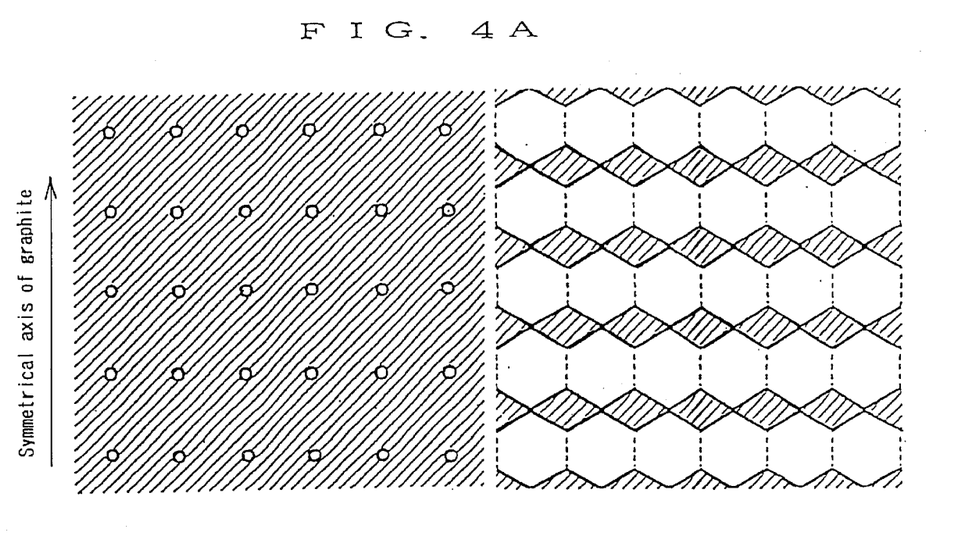
FIG. 4A is views in left side illustrative of the same placement of the growth points of holes as illustrated in FIG. 3A, wherein the vertical-to-horizontal ratio of the lattice is less than $\sqrt{3}$, as well as in right side illustrative of the periodical final structure with diamond shapes regularly aligned.

FIG. 4A is views in left side illustrative of the same placement of the growth points of holes as illustrated in FIG. 3A, wherein the vertical-to-horizontal ratio of the lattice is less than $\sqrt{3}$, as well as in right side illustrative of the periodical final structure with diamond shapes regularly aligned. If the hole growth process will furthermore be continued, then the size of the micro-structure with diamond shapes is reduced.

Figure 4B:
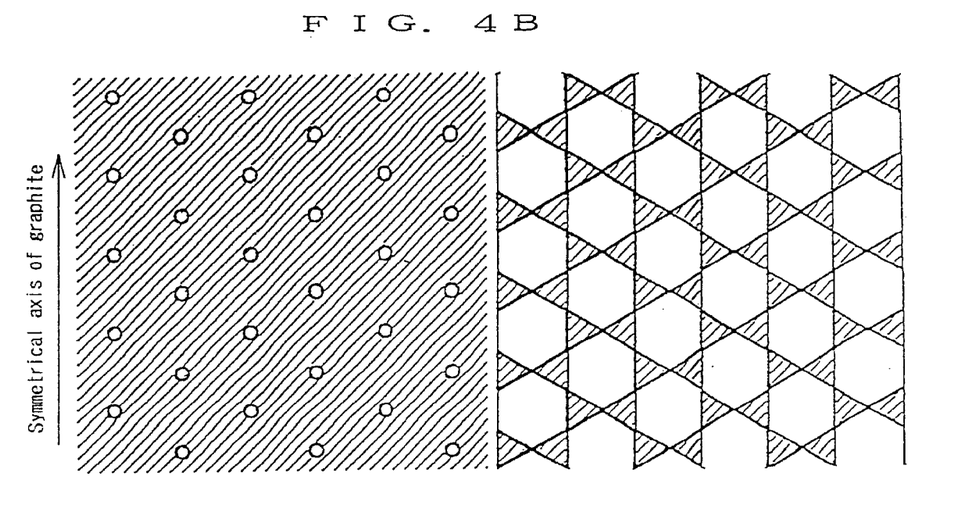
FIG. 4B is views in left side illustrative of the hexagonal lattice of the growth points of holes as well as in right side illustrative of periodical alignment of equilateral triangle micro-structure of graphite on the top surface atomic layer.

FIG. 4B is views in left side illustrative of the hexagonal lattice of the growth points of holes as well as in right side illustrative of periodical alignment of equilateral triangle micro-structure of graphite on the top surface atomic layer.

Figure 4C:
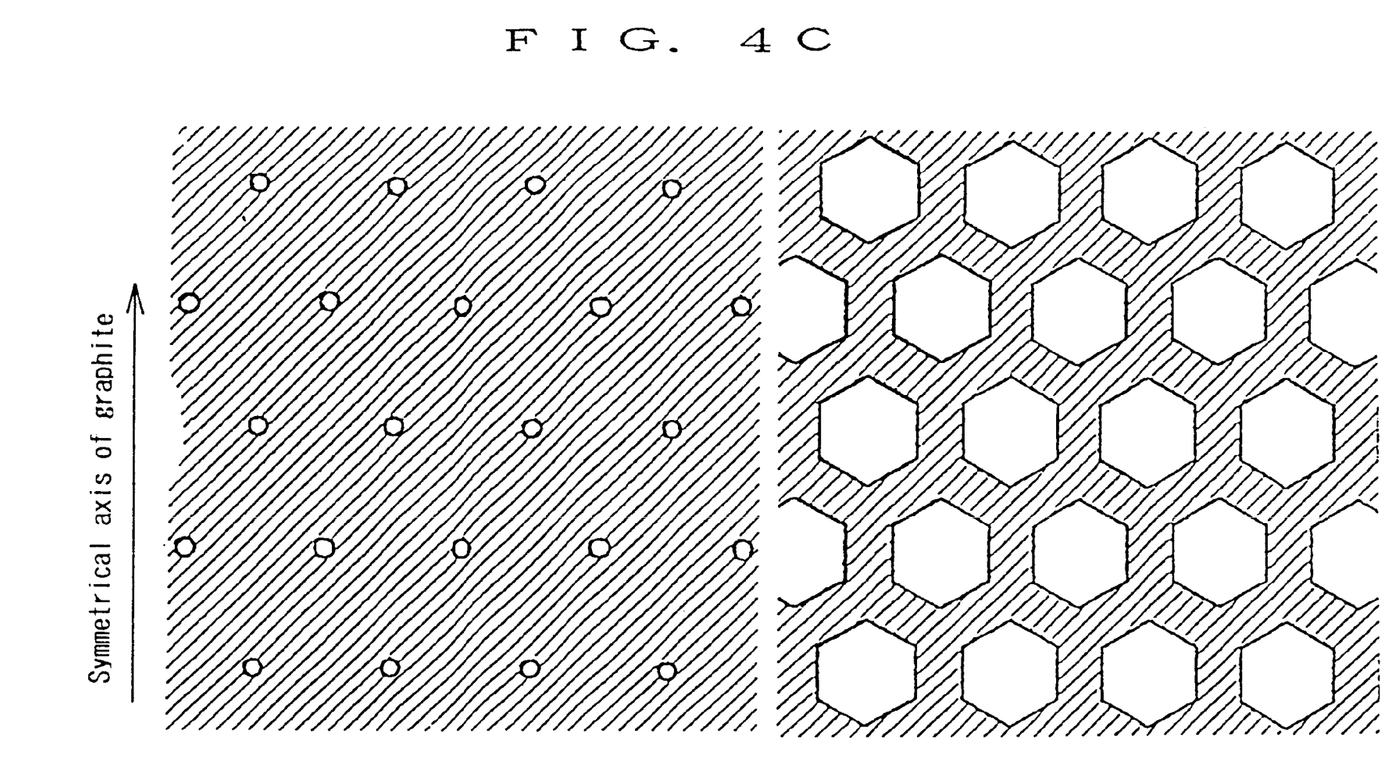
FIG. 4C is views in left side illustrative of the hexagonal lattice of the growth points of holes in FIG. 4B wherein a direction is rotated by 90 degrees as well as in right side illustrative of the honey-comb shaped periodical final structure obtained by the heat treatment.

FIG. 4C is views in left side illustrative of the hexagonal lattice of the growth points of holes in FIG. 4B wherein a direction is rotated by 90 degrees as well as in right side illustrative of the honey-comb shaped periodical final structure obtained by the heat treatment.

If the heat treatment is discontinued prior to the final process of the hole growth, the one-dimensional graphite with zigzag edges or the two-dimensional graphite sheet with the circle or hexagon holes can be obtained.

It is possible to freely select the position of the lattice of the growth point of holes. Various and periodical micro-structure of graphite may be formed as illustrated in FIGS. 5A through 5F.

Figure 5A:
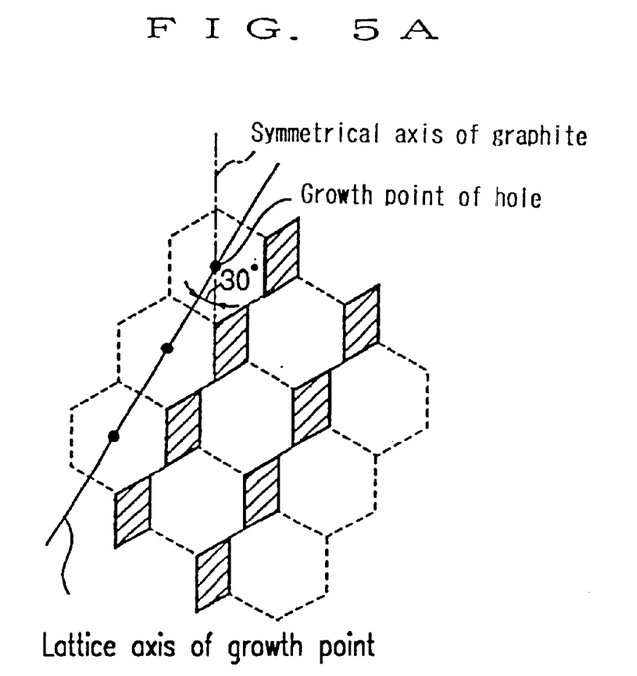
FIG. 5A is a view illustrative of periodical alignment of microstructure of graphite wherein a lattice axis of growth point of hole has an angle of 30 degrees to the symmetrical axis of the micro-structure of graphite.
Figure 5B:
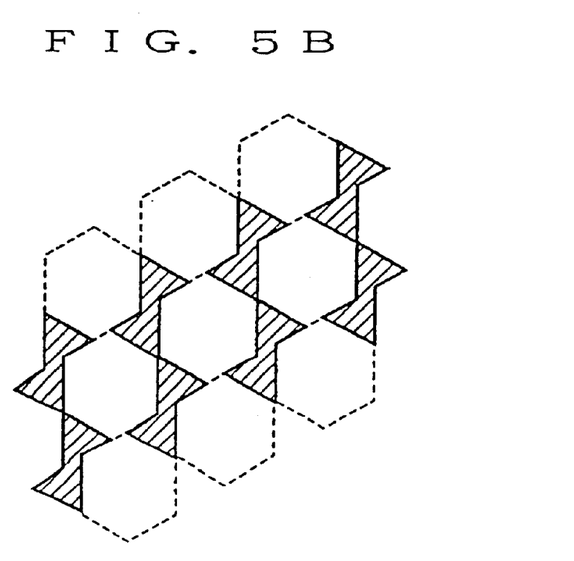
FIG. 5B is a view illustrative of periodical alignment of microstructure of graphite wherein a lattice axis of growth point of hole has an angle of 60 degrees to the symmetrical axis of the micro-structure of graphite.
Figure 5C:
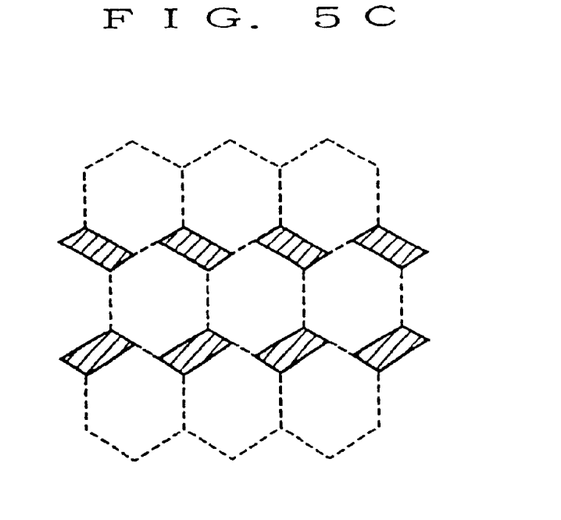
FIG. 5C is a view illustrative of periodical alignment of microstructure of graphite wherein a lattice axis of growth point of hole has an angle of 90 degrees to the symmetrical axis of the micro-structure of graphite.
Figure 5D:
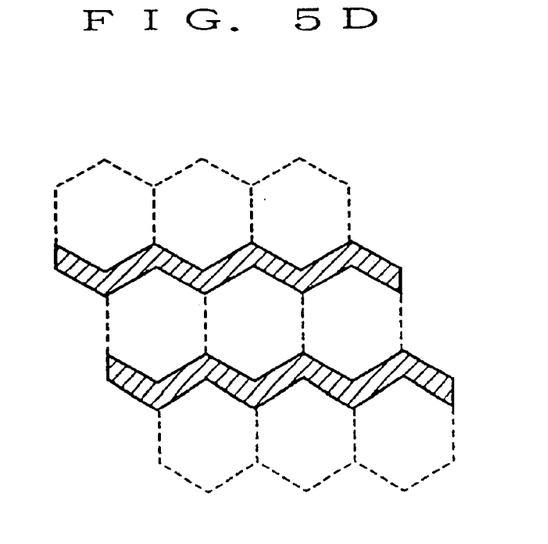
FIG. 5D is a view illustrative of periodical alignment of microstructure of graphite wherein a lattice axis of growth point of hole has an angle of 90 degrees to the symmetrical axis of the micro-structure of graphite and wherein two lattice axes makes an angle of 60 degrees.
Figure 5E:
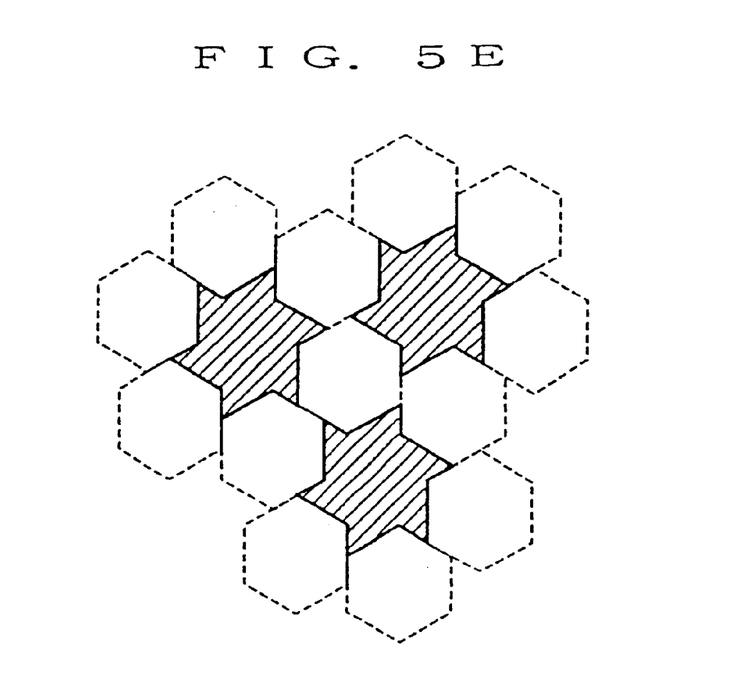
FIG. 5E is a view illustrative of one micro-structure of graphite when hexagonal alignment of growth points of holes is selected.
Figure 5F:
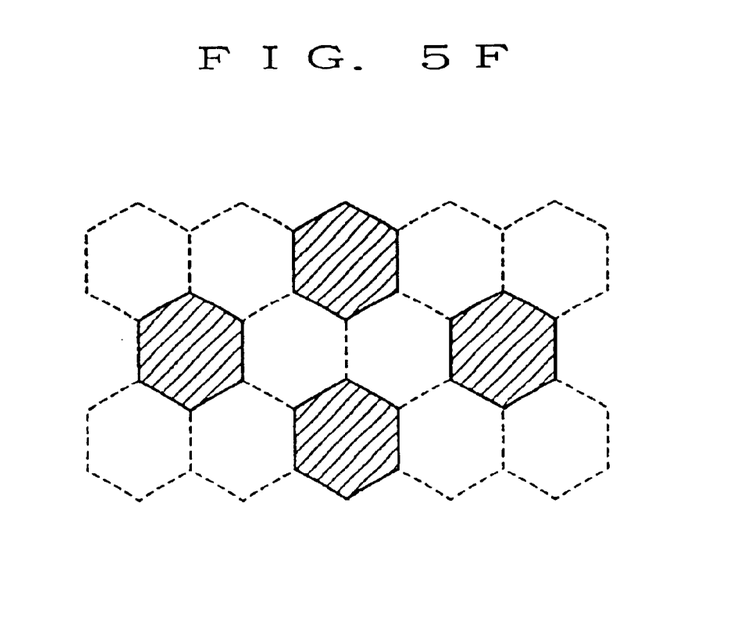
FIG. 5F is a view illustrative of another micro-structure of graphite when hexagonal alignment of growth points of holes is selected.

FIG. 5A is a view illustrative of periodical alignment of micro-structure of graphite wherein a lattice axis of growth point of hole has an angle of 30degrees to the symmetrical axis of the micro-structure of graphite. FIG. 5B is a view illustrative of periodical alignment of micro-structure of graphite wherein a lattice axis of growth point of hole has an angle of 60 de grees to the symmetrical axis of the micro-structure of graphite. FIG. 5C is a view illustrative of periodical alignment of micro-structure of graphite wherein a lattice axis of growth point of hole has an angle of 90 degrees to the symmetrical axis of the micro-structure of graphite. FIG. 5D is a view illustrative of periodical alignment of micro-structure of graphite wherein a lattice axis of growth point of hole has an angle of 90 de grees to the symmetrical axis of the micro-structure of graphite and wherein two lattice axes makes an angle of 60 de grees. FIG. 5E is a view illustrative of one micro-structure of graphite when hexagonal alignment of growth points of holes is selected. FIG. 5F is a view illustrative of another micro-structure of graphite when hexagonal alignment of growth points of holes is selected.

Preferred Embodiment

A newly cleaved graphite substrate was set in an vacuum chamber in an electron beam system and discharge by turbo pumps was made to obtain a vacuum of about $1 \times 10^{-6}$ Torr or lower.

After the sufficiently high vacuum was obtained, in order to remove oxygen molecules and water molecules adhered on the substrate surface, an electron beam of an extremely low current density of $5 \times 10^{-2}$ A/cm$^2$ or less was irradiated onto the graphite surface for 10 minutes at a surface temperature of not more than 1000° C.

In order to form the growth points of holes, electron beams having an kinetic energy of about 4 keV per one electron and having a current density of not less than $2.5 \times 10^{-1}$ A/cm$^2$ was irradiated onto the graphite surface for a few seconds to a few minutes. The time of irradiation defines the density of the holes. Subsequently, the electron beam with the current density of not more than the threshold value was irradiated onto the graphite to heat the same to grow the holes. In place of the electron beam irradiation, other heating measures may be used. By controlling the surface temperature and heating time, the size and shape of the holes are controllable. The graphite substrate was placed in the vacuum chamber until the same was sufficiently cooled. Thereafter, the graphite substrate was taken from the vacuum chamber.

The following descriptions will focus on the use of probes of the scanning tunneling microscope to form periodical micro-structure of graphite.

A piezo electric device was computer-controlled to accurate drive the probes of the scanning tunneling microscope. The probes of the scanning tunneling microscope were set so as to repeat movement at a constant pitch interval and stop at a constant time over the graphite cleaved surface under atmospheric pressure. When the probes are stopped, then a high bias pulse voltage for example about 2.5 V to 10 V was applied to the probe. The distance of the top of the probe from the surface of the cleaved graphite surface is 1 nanometer. Thus, an extremely high electric field of about $1 \times 10^9$ V/m was caused to derive chemical reaction carbon atoms with water molecules adhered on the graphite surface.

Since the high field is applied only to a position directly under the top of the probe, the chemical reaction is locally caused directly under the top of the probe whereby a micro-hole is formed on the graphite surface. The smallest hole diameter is about 4 nanometers. As the bias voltage to be applied to the probe is increased, then the diameter of the hole to be formed is also increased. If the bias voltage is kept constant, then it is possible to form holes of uniform sizes and positioned periodically.

The above graphite substrate was then set in the above vacuum chamber for subsequent heat treatment to the substrate. In avoid formation of the holes on the second atomic layer underlying the top atomic layer, it is required that the kinetic energy per one electron is set not more than 4 keV, otherwise the current density of electron beam is set not more thin $2.5 \times 10^{-1}$ A/cm$^2$. The heating time and substrate surface temperature were determined in accordance with the placement of the growth points of holes and the finally intended periodical micro-structure.

Growth Process of Hole

Figure 6:
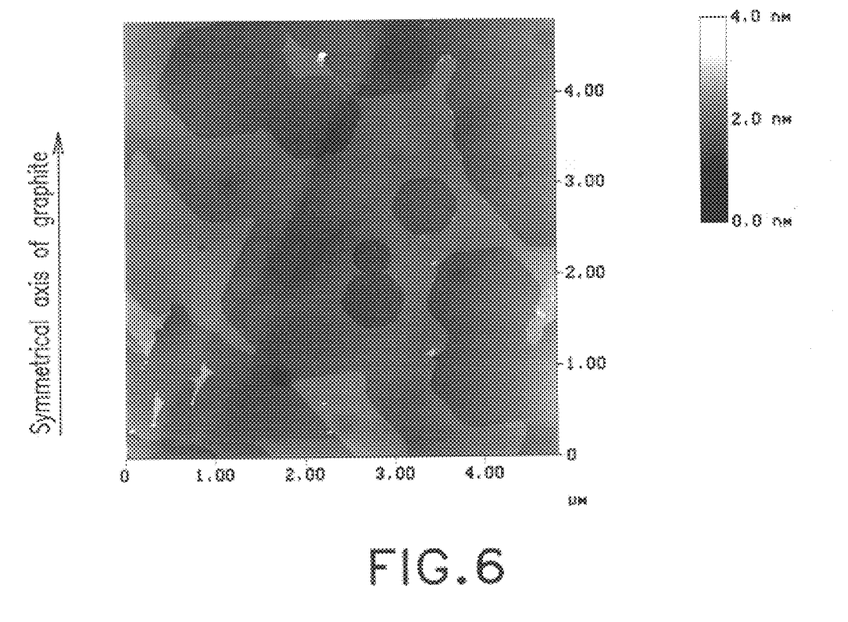
FIG. 6 is a view illustrative of HOPG surface observed by scanning tunneling microscope, wherein graphite has been irradiated with about 4 keV electrons and the light and shade represent the depth in vertical direction from the bottom of the substrate.

FIG. 6 is a view illustrative of HOPG surface observed by scanning tunneling microscope, wherein graphite has been irradiated with about 4 keV electrons and the light and shade represent the depth in vertical direction from the bottom of the substrate.

If the 4 keV electrons are irradiated, then the formation of the new holes and growth of the previously formed holes concurrently appear, for which reason various holes exist in various growth processes. The first feature is that the shape of the hole is changed from the circle to hexagon. If the size of the hole is in the range of about 10–500 nanometers, then the shape of the hole is circle. By contrast, if the size of the hole is more than 500 nanometers, then the shape of the hole is hexagon with rounded six angles. The second feature is that the equilateral hexagons are parallel to each other and namely oriented in the sane direction. The directions of the three pairs of parallel and opposite sides of the hexagon respectively correspond to three symmetrical axes of the graphite sheet. The holes are grown with keeping the hexagonal shape. This means that carbon atoms on the hole edges around the growth point of hole are evaporated accurately in the atomic level.

The third feature is that the depth of the hole is uniform and constant at 0.34 nanometers. This means that holes are formed only in the top atomic layer. The holes are not grown in the vertical direction but are of course grown in the in-plane direction. The electrons to be irradiated onto the graphite surface has an energy capable of making the hole only in the top atomic layer but not in the base atomic layers underlying the top atomic layer.

Graphite Material With Geometrically Shaped Holes

Figure 7:
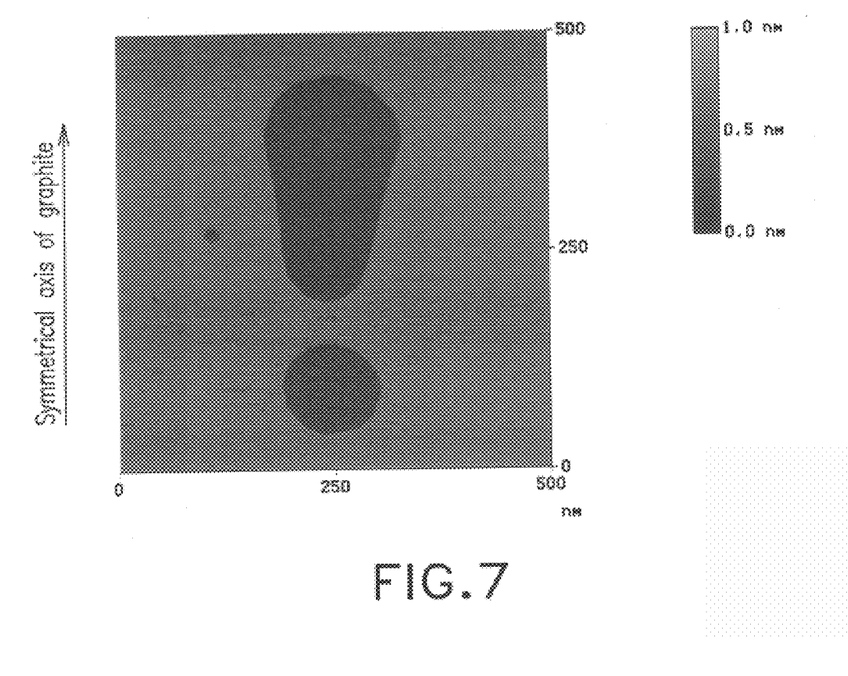
FIG. 7 is a view illustrative of "!" mark hole in the graphite observed by the scanning tunneling microscope.

FIG. 7 is a view illustrative of "!" mark hole in the graphite observed by the scanning tunneling microscope. The growth points of holes are not uniformly positioned so that in the upper region the pitch of the growth points of holes is narrow whilst in the lower region the pitch is wide, so that in the upper region the holes are grown and united with each other whilst the hole in the lower region the hole is grown but not separated from the holes in the upper region.

Dependency Upon Heating Temperature

Figure 8A:
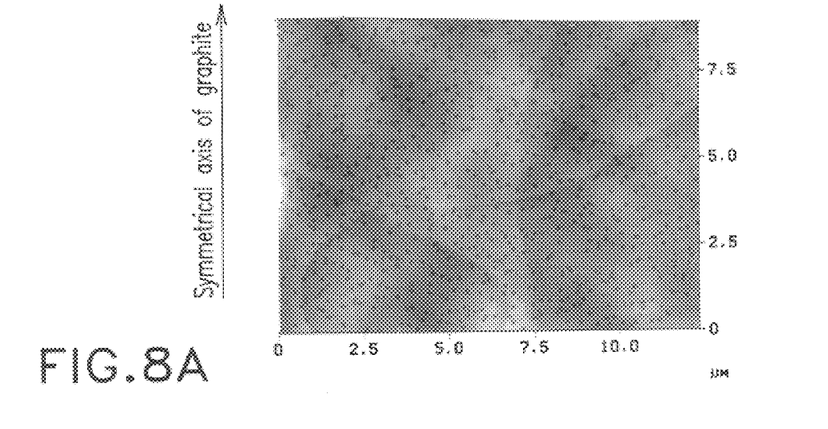
FIG. 8A is a view illustrative of HOPG surface at a temperature of about 150° C. observed by the scanning tunneling microscope, wherein the heating time is set at a predetermined constant value.
Figure 8B:
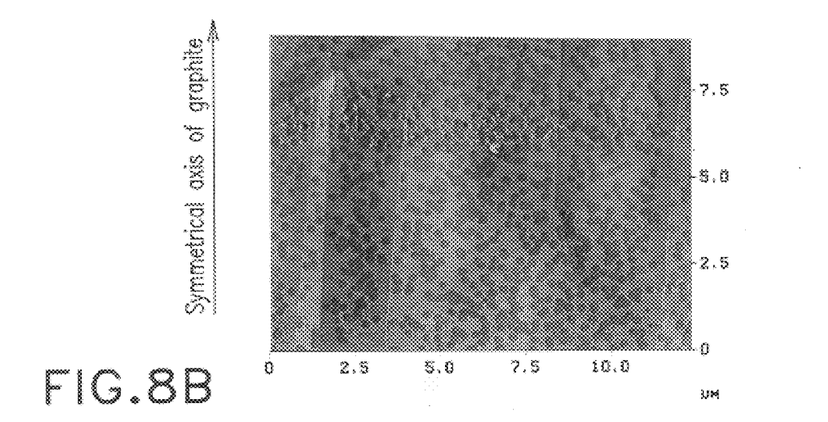
FIG. 8B is a view illustrative of HOPG surface at a temperature of about 2500° C. observed by the scanning tunneling microscope, wherein the heating time is set at a predetermined constant value.
Figure 8C:
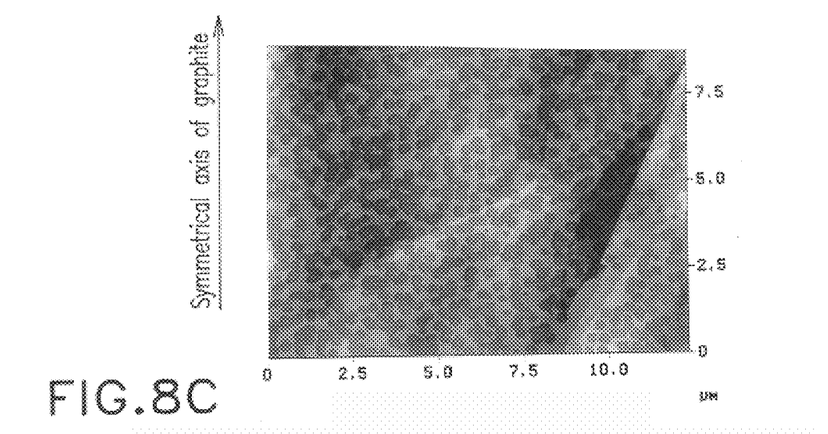
FIG. 8C is a view illustrative of HOPG surface at a temperature of about 3500° C. observed by the scanning tunneling microscope, wherein the heating time is set at a predetermined constant value.

The heat temperature was changed during the growth of the holes to investigate the influence of temperature variation to the growth of the holes. FIG. 8A is a view illustrative of HOPG surface at a temperature of about 150° C. observed by the scanning tunneling microscope, wherein the heating time is set at a predetermined constant value. FIG. 8B is a view illustrative of HOPG surface at a temperature of about 2500° C. observed by the scanning tunneling microscope, wherein the heating time is set at a predetermined constant value. FIG. 8C is a view illustrative of HOPG surface at a temperature of about 3500° C. observed by the scanning tunneling microscope, wherein the heating time is set at a predetermined constant value. The size of the initial holes are uniform over FIGS. 8A through 8C and the depth of the holes are also uniform at 0.34 nanometers which corresponds to the mono-atomic layer. In FIG. 8A, the diameter of the holes is 80±20 nanometers. In FIG. 8B, the diameter of the holes is 180±20 nanometers. In FIG. 8C, the diameter of the holes is 280±20 nanometers. As the surface temperature is high, the growth rate in the in-plane direction is high. The density of the holes are uniform at about $7/\mu m^2$ over FIGS. 8A through 8C. The size of the hole is controllable by controlling the heating temperature. The size of the hole is also controllable by controlling the heating time. Of course, as the heating time is long, then the large size hole is formed.

Graphite Material With Helical-Shape Holes

Figure 9:
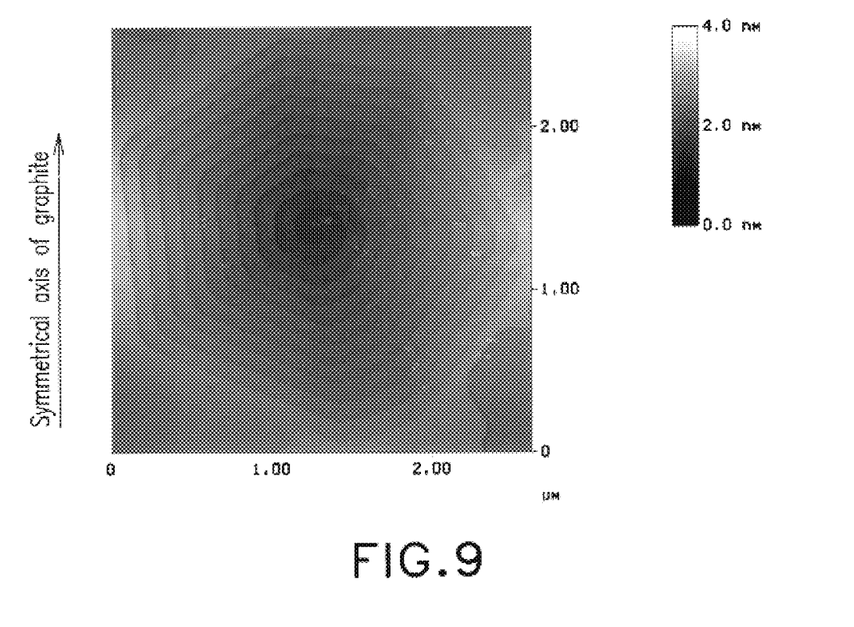
FIG. 9 is a view of a hole grown on the helical dislocation of graphite observed by the scanning tunneling microscope. Helix hole is formed around the helical dislocation.

FIG. 9 is a view of a hole grown on the helical dislocation of graphite observed by the scanning tunneling microscope. Helix hole is formed around the helical dislocation. In the vicinity of the center, the depth of the hole is deeper to form cone-shape. The whole size of the hole is about 2.5 micrometers in diameter. The external shape is strained seven angled shape. The width of helix is about 100 nanometers. About 10 stages of the helix are formed toward the center. A dislocation extends on a line including top and bottom points of the strained seven angled shape and including the center. The symmetrical axes both in the left and right sides with reference to the dislocation are different from each other which is shown by a difference in orientation direction of the equilateral hexagon hole around the helix, for which reason the strained seven-angled shape is formed. The reason why the hole is grown not only in the in-plane direction but in the depth direction is that the graphite sheets are continuously connected with each other at the helical dislocation. It is possible to obtain such specific micro-structure as illustrated in FIG. 9 is obtainable by utilizing the helical dislocation.

One Dimensional Lattice Structure

Figure 10:
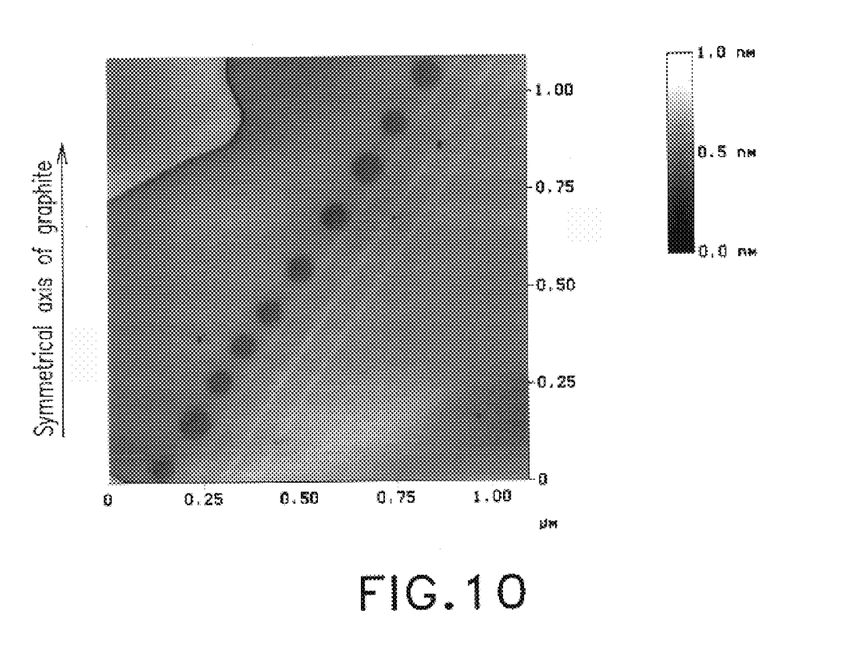
FIG. 10 is a view illustrative of one dimensional lattice of holes grown from growth points of hole aligned in a straight line observed by the scanning tunneling microscope.

FIG. 10 is a view illustrative of one dimensional lattice of holes grown from growth points of hole aligned in a straight line observed by the scanning tunneling microscope. Since the size of the growth point of hole is uniform, the grown hole size is also uniform at about 65 nanometers in diameter. The period is about 150 nanometers.

Two Dimensional Lattice Structure

Figure 11:
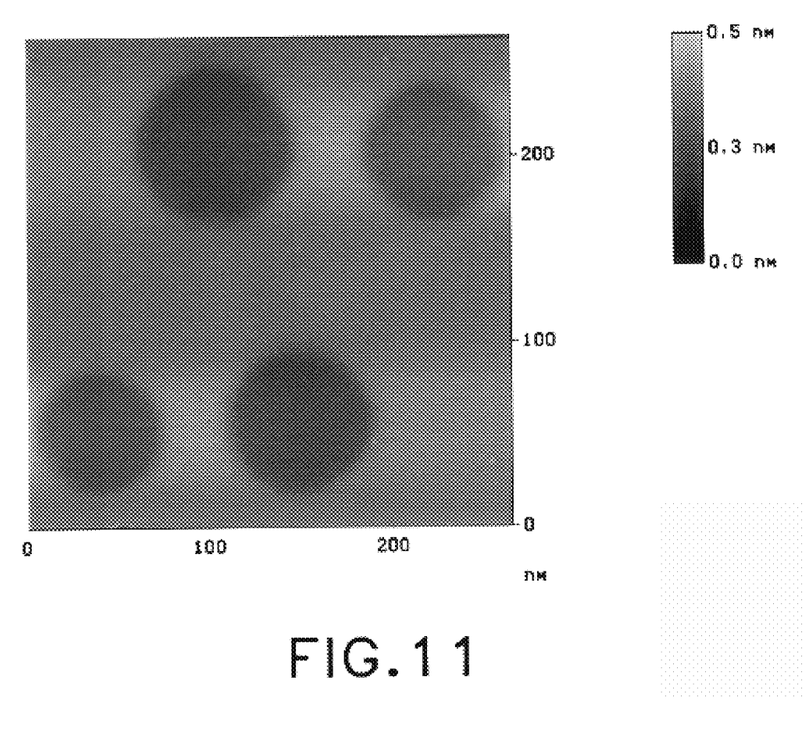
FIG. 11 is a view illustrative of two dimensional lattice of holes grown from growth points of hole periodically aligned in two-dimensional space, observed by the scanning tunneling microscope.

FIG. 11 is a view illustrative of two dimensional lattice of holes grown from growth points of hole periodically aligned in two-dimensional space, observed by the scanning tunneling microscope. The grown hole size is about 75 nanometers in diameter. The periods are about 120 nanometers in horizontal direction and about 170 nanometers in oblique direction. The equilateral hexagon of the hole first appear after the size of the holes have become larger than about 500 nanoemters. The period should be determined in consideration of this matter. The periodical structures shown in FIGS. 3A through 5F are available.

In accordance with the present invention, the electron beam is irradiated onto the graphite surface to form geometrically shaped microholes. The growth points of holes are periodically aligned at a constant pitch so that the graphite sheet with the periodically aligned holes or geometrical micro-structures of graphite aligned periodically can be prepared.

The graphite sheet with the circular or hexagonal microholes and the geometrically shaped micro-structures of graphite are defined by curve or straight edges accurately in atomic level. Further, the base atomic layers underlying the top atomic layers are free of any damage. The placement of the growth points of holes may be varied to obtain geometrically shaped various micro-structure of graphite which are periodically aligned.

The graphite sheet with the circular or hexagonal microholes and the geometrically shaped micro-structures of graphite possess specific and unique electric and magnetic properties, for which reason the above carbon materials may be applicable to nanometer size elements or parts, substrates for crystal growth, interconnections in integrated circuits, electronics devices, quantum effect devices, electrodes, magnetic materials and magnetic devices.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of patterning a surface atomic layer of a graphite sheet, comprising the steps of:

selecting a pattern to be formed in a surface atomic layer of a graphite sheet;

determining growth points in the selected pattern that will expand to form the selected pattern;

forming generally circular holes at the growth points only in the surface atomic layer; and radially enlarging the holes in the surface atomic layer by heating the surface atomic layer until the selected pattern is formed.

2. The method of claim 1, wherein the selected pattern comprises circles and wherein the heating is stopped before the holes reach about 500 nanometers in diameter.

3. The method of claim 1, wherein the selected pattern comprises generally hexagonal shapes and wherein the heating continues after the holes reach about 500 nanometers in diameter until the generally hexagonal shapes are formed.

4. The method of claim 1, wherein the heating continues until the holes form generally hexagonal shapes with adjacent edges that are merged together.

5. The method of claim 1, wherein the selected pattern comprises generally parallel stripes and wherein the heating continues until the holes merge together to form the generally parallel stripes.

6. The method of claim 1, wherein the holes are formed by electron beam irradiation.

7. The method of claim 1, wherein the holes are formed by converging electron beam irradiation.

8. The method of claim 1, wherein the holes are formed by converging ion beam irradiation.

9. The method of claim 1 wherein the holes are formed by a probe of a scanning tunneling microscope.

10. The method of claim 1, wherein the holes are formed by a probe of an atomic force microscope.

* * * * *